United States Patent
Tomita et al.

(10) Patent No.: US 9,703,253 B2
(45) Date of Patent: Jul. 11, 2017

(54) TONER CONVEYANCE DEVICE AND IMAGE FORMING APPARATUS

(71) Applicants: Daisuke Tomita, Kanagawa (JP); Toshiya Satoh, Kanagawa (JP); Satoshi Hatori, Kanagawa (JP); Takeshi Fukao, Kanagawa (JP); Hajime Teraji, Kanagawa (JP); Norio Kudoh, Kanagawa (JP); Hiroyuki Uenishi, Kanagawa (JP)

(72) Inventors: Daisuke Tomita, Kanagawa (JP); Toshiya Satoh, Kanagawa (JP); Satoshi Hatori, Kanagawa (JP); Takeshi Fukao, Kanagawa (JP); Hajime Teraji, Kanagawa (JP); Norio Kudoh, Kanagawa (JP); Hiroyuki Uenishi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/131,949

(22) Filed: Apr. 18, 2016

(65) Prior Publication Data
US 2016/0306318 A1 Oct. 20, 2016

(30) Foreign Application Priority Data

Apr. 17, 2015 (JP) ................. 2015-084646

(51) Int. Cl.
  *G03G 21/10* (2006.01)
  *G03G 15/08* (2006.01)
  *H04N 1/00* (2006.01)

(52) U.S. Cl.
  CPC ....... *G03G 21/105* (2013.01); *G03G 15/0879* (2013.01); *H04N 1/00909* (2013.01); *H04N 2201/0094* (2013.01)

(58) Field of Classification Search
  CPC .................. G03G 21/105; H04N 1/00909
  USPC ..................................... 399/359, 360
  See application file for complete search history.

(56) References Cited

U.S. PATENT DOCUMENTS

| 8,428,475 B2 | 4/2013 | Tomita et al. |
| 2005/0008416 A1* | 1/2005 | Serizawa ............. G03G 21/105 399/358 |
| 2009/0016777 A1 | 1/2009 | Miyamoto et al. |
| 2011/0110694 A1* | 5/2011 | Ishikake ................ G03G 21/12 399/360 |
| 2014/0010579 A1 | 1/2014 | Yoshino et al. |
| 2015/0078795 A1 | 3/2015 | Kuwabara et al. |
| 2015/0301496 A1 | 10/2015 | Kawashima et al. |

FOREIGN PATENT DOCUMENTS

| JP | 2008-292726 | 12/2008 |
| JP | 2009-069800 | 4/2009 |

* cited by examiner

*Primary Examiner* — Sandra Brase
(74) *Attorney, Agent, or Firm* — Oblon, McClelland, Maier & Neustadt, L.L.P.

(57) ABSTRACT

A toner conveyance device includes a toner conveyance path through which toner is transported. The toner conveyance path includes a flexible portion, a toner conveyor inside the conveyance path to convey the toner, and a restrictor outside the toner conveyance path to restrict deformation of the toner conveyance path.

19 Claims, 5 Drawing Sheets

TONER CONVEYANCE DEVICE AND IMAGE FORMING APPARATUS

CROSS-REFERENCE TO RELATED APPLICATIONS

This patent application is based on and claims priority pursuant to 35 U.S.C. §119(a) to Japanese Patent Application No. 2015-084646, filed on Apr. 17, 2015, in the Japan Patent Office, the entire disclosure of which is hereby incorporated by reference herein.

BACKGROUND

Technical Field

Embodiments of the present invention generally relate to a toner conveyance device and an image forming apparatus, such as, a copier, a printer, a facsimile machine, a plotter, or a multifunction peripheral (i.e., multifunction machine or MFP) having at least two of copying, printing, facsimile transmission, plotting, and scanning capabilities, that includes the toner conveyance device.

Description of the Related Art

Typically, image forming apparatuses, such as printers, copiers, facsimile machines, and MFPs having those capabilities, includes a toner conveyance device to transport toner from a transport source to a transport destination. The transport source and the transport destination are connected by a toner conveyance pipe (i.e., toner conveyance tube) formed of an elastic material.

For details, the transport source such as a cleaning device and the transport destination such as a developing device are connected by a flexible toner conveyance pipe such as a collection tube. A toner conveyance channel or pipe is disposed between the transport source and the transport destination. A toner conveyance coil such as a spring coil is disposed inside of the conveyance pipe. When the toner conveyance coil is rotatory driven in a predetermined direction by a driving source, the toner moves inside the toner conveyance pipe and the toner is transported from the transport source toward the transport destination.

In a typical image forming apparatus, it is possible to compose a curved toner conveyance pipe and to increase a degree of freedom of a shape of the toner conveyance channel because the toner conveyance channel uses the flexible toner conveyance pipe. Since the toner conveyance coil is disposed inside the conveyance pipe, the toner conveyance channel can ensure an ability of the toner conveyance, preventing from accumulating the toner, without an air pump even though a shape of the toner conveyance channel is comparatively complicated.

SUMMARY

An embodiment of the present invention provides a toner conveyance device to transport toner from a transport source to a transport destination disposed inside an image forming apparatus. The toner conveyance device includes the toner conveyance path through which toner is transported, the toner conveyance path includes a flexible portion, the toner conveyor inside the conveyance path to convey the toner, and the restrictor outside the toner conveyance path to restrict deformation of the toner conveyance path.

BRIEF DESCRIPTION OF THE SEVERAL VIEWS OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
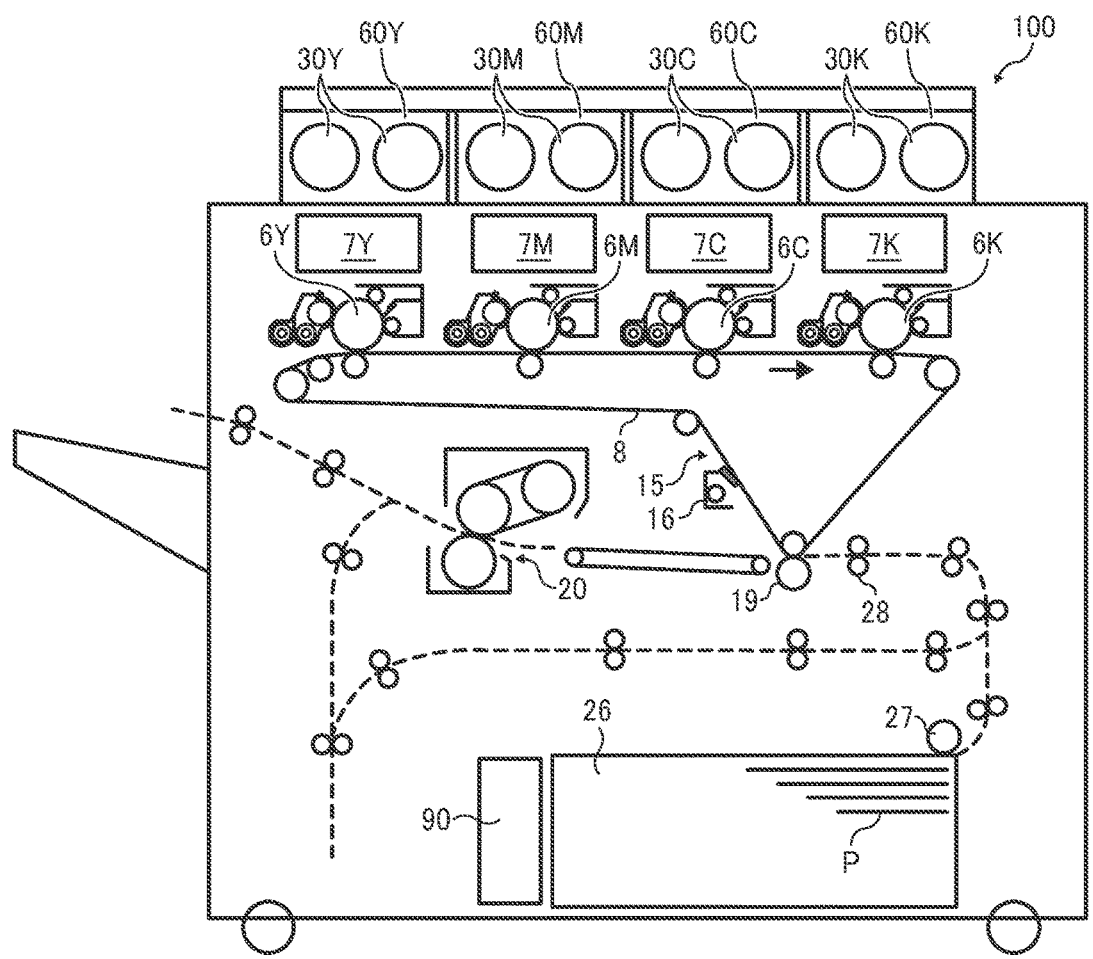
FIG. 1 is a schematic view of an image forming apparatus according to an embodiment of the present invention.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

In toner conveyance devices with a toner conveyance channel having a toner conveyance pipe with a high curvature, it is possible that the toner conveyance coil inside the toner conveyance tube will interfere with an inner wall of the toner conveyance tube which is buckled or flattened. This will cause the toner conveyance coil or the toner conveyance tube to wear, and a driving torque of the toner conveyance coil may increase. If these problems arise, it is possible that the toner conveyance coil or the toner conveyance pipe will be damaged and the ability of the toner conveyance will be decreased.

According to the embodiment described below, the toner conveyance coil interfering with the inner wall of the toner conveyance tube being bucked or flattened is inhibited, even though the toner conveyance channel includes the flexible toner conveyance tube, and the toner conveyance coil is inside of the toner conveyance tube.

Figure 2:
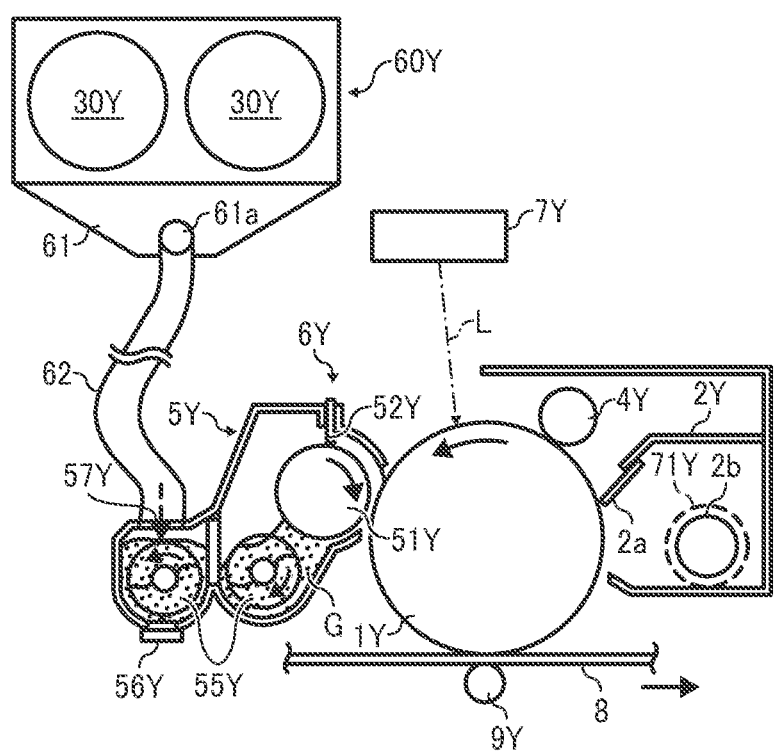
FIG. 2 is a schematic cross-sectional view of one example of a process cartridge of the present invention.

Referring now to the drawings, wherein like reference numerals designate identical or corresponding parts throughout the several views thereof, and particularly to FIG. 1, a multicolor image forming apparatus 100 according to an embodiment of the present invention is described. FIG. 1 a schematic view of an image forming apparatus according to the present embodiment. FIG. 2 is a schematic view of an area near a process cartridge of the image forming apparatus shown in FIG. 2.

In FIG. 1, the image forming apparatus 100 includes two cylindrical toner containers 30Y, 30M, 30C and 30K for each color (yellow, magenta, cyan and black) detachably attached to a toner supplying devices (i.e., developer supplying device) 60Y, 60M, 60C and 60K arranged on an upper side of the image forming apparatus 100. There are multiple process cartridges 6Y, 6M, 6C and 6K for respective colors between each multiple exposure device 7Y, 7M, 7C and 7K facing an intermediate transfer belt 8 of an intermediate transfer belt unit 15 on a lower side of the four toner supplying devices 60Y, 60M, 60C and 60K.

With reference to FIG. 2, the yellow process cartridge 6Y includes a photoconductor 1Y as an image bearer, a charging device 4Y, a developing device 5Y and a cleaning device 2Y around the photoconductor 1Y. The photoconductor 1, the charging device 4Y, the developing device 5Y and the cleaning device 2Y, which are incorporated in the process cartridge 6Y, are replaceable at a same time as a detachable unit. And imaging forming processes (a charging process, an exposing process, a developing device, a transferring process and a cleaning process) are performed on the photoconductor 1Y.

The other three process cartridges 6M, 6C and 6K have a similar configuration and function as the process cartridge 6Y except for a toner color and form the image corresponding to each color. Since the description of the process cartridge 6Y can be applied to other process cartridges 6M, 6C and 6K, hereinafter the description of the process cartridge 6Y is only provided and the description of process cartridges 6M, 6C and 6K is omitted.

As illustrated in FIG. 2, the photoconductor 1Y rotates in a counterclockwise direction by a drive motor. When the surface of the photoconductor 1Y arrives at the charging device 4Y, the photoconductor 1Y is uniformly charged by the charging device 4Y. This process is known as the charging process.

After the surface of the photoconductor 1Y is uniformly charged, the exposure device 7Y illuminates the surface thereof with a laser light L, thereby forming an electrostatic latent image corresponding to yellow thereon. This process is known as the exposure process.

As the surface of the photoconductor 1Y comes to the development device 5Y, the electrostatic latent image is developed with toner, thereby forming a toner image. This process is known as the developing process.

As the toner image on the photoconductor 1Y arrives at a position opposite a primary transfer roller 9Y via the intermediate transfer belt 8 after the development as described above, the toner image is primarily transferred onto the intermediate transfer belt 8. This process is a so-called primary transfer process. After the primary transfer process, a small amount of toner (i.e., untransferred toner), which has not been transferred onto the intermediate transfer belt 8, remains on the photoconductor 1Y.

As the photoconductor 1Y rotates and comes to a cleaning device 2Y, a cleaning blade 2a cleans the untransferred toner on the surface of the photoconductor 1Y and collects the untransferred toner in the cleaning device 2Y. The untransferred toner includes residual toner adhered to the photoconductor 1Y, paper dust, and adhered substances such as charging objects. This process is known as the cleaning process.

Figure 3A:
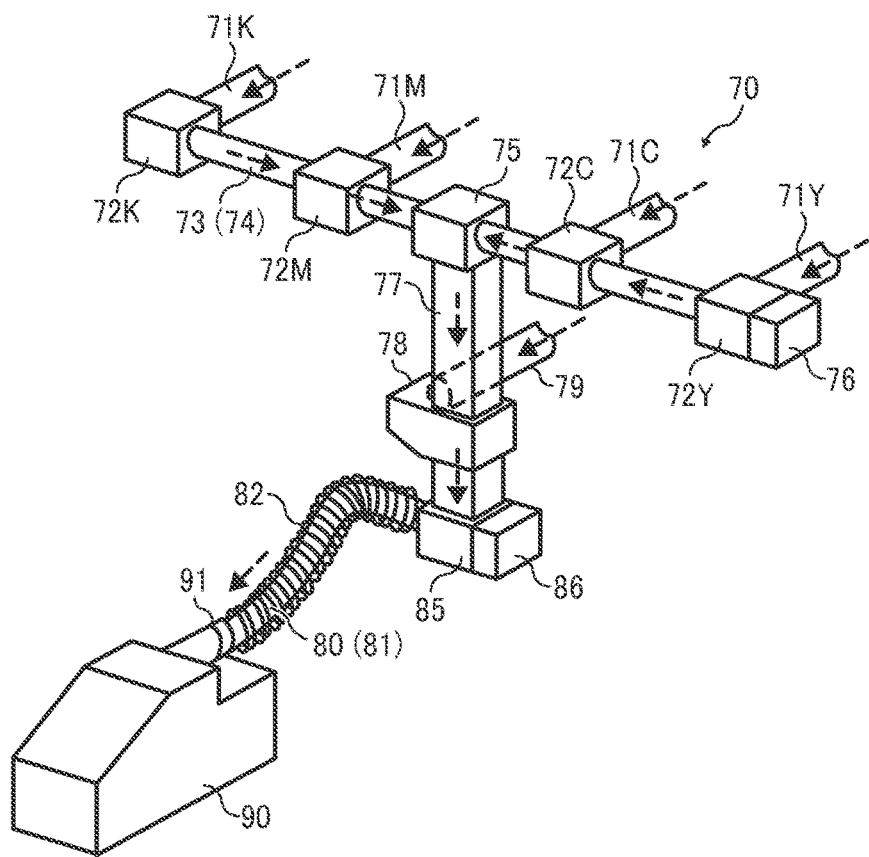
FIG. 3A is a perspective view of a toner conveyance device according to an embodiment.
Figure 3B:
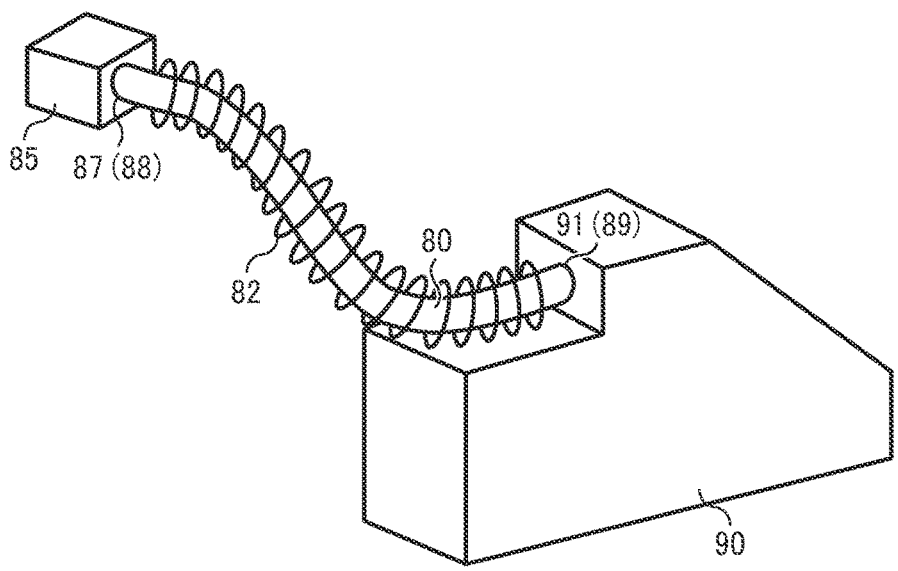
FIG. 3B is a perspective view of a part of a toner conveyance device according to an embodiment as viewed from the opposite side of FIG. 4A.

Lastly, the photoconductor 1Y comes to the charge eraser. The charge eraser removes residual potential from the surface of the photoconductor 1Y in preparation for the subsequent imaging cycle, thereby completing a sequence of the image forming processes on the photoconductor 1Y. In addition, the untransferred toner cleaned and collected by the cleaning device 2Y is conveyed in the axial direction of a conveyance screw 2b (the orthogonal direction to the surface of a sheet of paper in FIG. 1 and FIG. 2) inside of a horizontal conveyance tube 71Y. Referring to FIGS. 3A and 3B, after the untransferred toner is conveyed inside the horizontal conveyance tube 71Y, untransferred toner is conveyed to a waste toner container 90 by a toner conveyance device 70 and is collected inside the waste toner container 90 as waste toner. The waste toner conveyance process is described in detail below.

The image forming process described above is performed in the other process cartridges 6Y, 6C and 6M similar to the yellow process cartridge 6Y. The laser light L based on an image information is illuminated from each exposure device 7M, 7C and 7K such as a laser above the process cartridge 6Y, 6C and 6M to the surface of each photoconductor 1M, 1C and 1K of the process cartridge 6Y, 6C and 6M. For more details, an exposure portion emits the laser light L from a laser light source to the surface of the photoconductor 1M, 1C and 1K via plurality of optical elements while scanning the laser light L by rotating a polygon mirror driven by a motor. After that, each toner image formed on the photoconductor through the developing process are primary transferred onto the intermediate transfer belt 8, thus forming a color image on the intermediate transfer belt 8.

The intermediate transfer unit 15 includes a belt member, i.e., the intermediate transfer belt 8, a primary transfer roller 9Y, a drive roller, a secondary-transfer opposing roller, multiple tension rollers, a correction opposing roller, a belt cleaning device 16, and so forth.

The intermediate transfer belt 8 is entrained around and stretched taut by the plurality of rollers and is rotated by one roller in the direction indicated by an arrow in FIG. 1. The intermediate transfer belt 8 is interposed between the primary transfer roller 9Y and the photoconductor 1Y, 1M, 1C and 1K, thereby forming a primary transfer nip. A transfer bias consisting of a transfer voltage having a polarity opposite to that of the toner is applied to the primary transfer roller 9Y.

While the intermediate transfer belt 8 moves in the direction of the arrow in FIG. 1, the toner image formed on the photoconductor 1Y, 1M, 1C and 1K are primarily transferred onto the intermediate transfer belt 8 at the primary transfer nip of the primary transfer roller 9.

Subsequently, the intermediate transfer belt 8 bearing the primarily transferred toner image arrives at a position opposite a secondary transfer roller 19. The intermediate transfer belt 8 is interposed between the secondary-transfer opposing roller and the secondary transfer roller 19, thereby forming a secondary transfer nip. Subsequently, the toner image formed on the surface of the intermediate transfer belt 8 is secondarily transferred onto a recording medium P delivered to the secondary transfer nip. Some toner (untransferred toner) having not been transferred onto the recording medium P remains on the intermediate transfer belt 8.

Subsequently, the intermediate transfer belt 8 arrives at the belt cleaning device 16 which removes the untransferred toner from the intermediate transfer belt 8 thereby completing a sequence of the transfer process. The belt cleaning device includes a cleaning blade and a conveyance screw as is the case with the cleaning device 2Y. Thus a sequence of the transferring process performed on the intermediate transfer belt 8 is completed.

In addition, the untransferred toner cleaned and collected by the belt cleaning device 16 is conveyed in an axial direction of a conveyance screw inside of a horizontal conveyance tube 79. Referring to FIG. 3, after the conveyance inside the horizontal conveyance tube 79, the untransferred toner is conveyed to a waste toner container 90 by a toner conveyance device 70 and is collected inside the waste toner container 90 as the waste toner. The waste toner conveyance process is described detail below.

Referring to FIG. 1, the recording medium P is supplied from a sheet feeding unit 26 disposed substantially at a lower portion of a main body of the image forming apparatus 100 and delivered to secondary transfer nip via a sheet feed roller 27, a pair of registration rollers 28, and so forth.

In the sheet feeding unit 26, a plurality of transfer sheets such as recording media sheets P is stacked. As the sheet feed roller 27 is rotated in the counterclockwise direction in FIG. 1, the sheet feed roller 27 picks up a top sheet from the stack of recording media P in the sheet feeding unit 26 and feeds it to the pair of registration rollers 28.

The recording medium P is temporarily stopped at the pair of registration rollers 28, rotation of which is stopped. Rotation of the pair of registration rollers 28 resumes in appropriate timing such that the recording medium P is sent to the secondary transfer nip and is aligned with the toner image formed on the intermediate transfer belt 8. Accordingly, the toner image is transferred onto the recording medium P.

The recording medium P on which the toner image is transferred at the secondary transfer nip is conveyed to a fixing device 20. Subsequently, the toner image transferred onto the recording medium P is fixed on the recording medium P with heat and pressure applied thereto, thereby forming an image on the recording medium P.

The recording medium P, on which the image is fixed, is discharged outside the image forming apparatus through a pair of sheet discharge rollers, onto a sheet stack portion, thereby completing a sequence of image forming processes in the image forming apparatus.

In addition, the waste toner container 90 which contains the untransferred toner cleaned by the cleaning device 2Y from the surface of the photoconductor 1Y and the untransferred toner cleaned by the belt cleaning device 16 from the surface of the intermediate transfer belt 8 is disposed near the sheet feeding unit 26, and detachably attached to the image forming apparatus 100.

Next, with reference to FIG. 2, a more detailed description is provided of the development device 5Y in the image forming unit 6Y. The development device 5Y includes a development roller 51Y facing the photoconductor 1Y, a doctor blade 52Y facing the development roller 51Y, two conveyor screws 55Y, a density detector 56Y, a toner supply opening 57Y to supply the developing agent chamber, and so forth. The development roller 51Y includes a magnet fixed inside thereto, a sleeve that rotates around the magnet, and so forth. The developing agent G is a two-component developing agent consisting of carrier and toner, and is stored inside the developing agent chambers.

The sleeve of the development roller 51Y rotates in the direction of the arrow in FIG. 2. The developing agent G on the development roller 51Y due to the magnetic field formed by the magnet travels on the development roller 51Y as the sleeve rotates. At this time, a ratio of toner in the developing agent G (density of toner) in the development device 5Y is adjusted to fall within a predetermined range.

Subsequently, the toner supplied to the developing agent chamber is mixed with the developing agent by the conveyor screws 55Y, and circulates (moves in the vertical direction relative to the surface of FIG. 2) in the developing agent chambers which are separated. Toner particles in the developing agent G stick to carrier particles due to frictional charging with the carrier particles. Then, the toner particles sticking to the carrier particles adhere to the development roller 51.

The developing agent G on the development roller 51Y is delivered the doctor blade 52Y in the direction of the arrow in FIG. 2 on the development roller 51Y. Subsequently, after an amount of the developing agent G on the development roller 51Y is optimized, the developing agent G is delivered to a development area opposite the photoconductor 1Y. An electric field formed in the development area causes the toner to stick to a latent image formed on the photoconductor 1Y. Subsequently, the developing agent remaining on the development roller 51Y reaches the upper portion of the developing agent chamber as the sleeve rotates, and then separates from the development roller 51Y.

The following description is a detailed configuration and operation of the toner conveyance device 70. The conveyance device 70 is to convey the toner from the transport source to the transport destination. In this embodiment, the transport source is the cleaning device 2Y and the belt cleaning device 16 where untransferred toner adhered to the surface of the photoconductor 1Y (i.e., image bearer) and the intermediate transfer belt 8 (i.e., intermediate transfer body) is cleaned and collected. In addition, the transport destination is the waste toner container 90 which collect the untransferred toner collected inside the cleaning device 2Y and the belt cleaning device 16 as the waste toner. In other words, with reference to FIGS. 3A and 3B, the toner (i.e., the untransferred toner) which cleaned and collected by each cleaning device 2Y of four process cartridges 6Y, 6M, 6C and 6K and the toner (i.e., the untransferred toner) which cleaned and collected by the belt cleaning device 16 are conveyed to the waste toner container 90 by the toner conveyance device 70 and collected inside the waste toner container 90 as the waste toner.

The following is a more detailed explanation of the toner conveyance device 70. The untransferred toner which was cleaned and collected by the yellow cleaning device 2Y passes through the horizontal conveyance tube 71Y, which includes the conveyance screw 2b rotatably driven in predetermined direction thereinside, and reaches a relay portion 72Y. Similarly, the untransferred toner which was cleaned and collected by the cyan cleaning device 2C passes through the horizontal conveyance tube 71C and reaches a relay portion 72C, the untransferred toner which was cleaned and collected by the magenta cleaning device 2M passes through the horizontal conveyance tube 71M and reaches a relay portion 72M and the untransferred toner which cleaned and collected by the black cleaning device 2K passes through the horizontal conveyance tube 71K and reaches a relay portion 72K. Next, the untransferred toner reaches a corresponding relay portion 72Y, 72C, 72M and 72K, passes through a second horizontal conveyance tube 73 which includes the conveyance screw 74 thereinside rotatably driven by a driving motor 76, and reaches a second relay portion 75 as shown by broken line arrow in FIG. 3A. The untransferred toner which reached the second relay portion 75 falls by its own weight inside a vertical conveyance tube 77 and passes through a third relay portion 78 and reaches a fourth relay portion 85. In addition, the conveyance screw 74 disposed inside the second conveyance tube 73 includes a spiral screw having a different winding direction relative to the second relay portion 75 in order to convey the untransferred toner toward the second relay portion 75 disposed at a center in the axial direction (i.e., longitudinal direction) from both ends in the axial direction.

On the other hand, the untransferred toner which cleaned and collected by the belt cleaning device 16 passes through the horizontal conveyance tube 79, which includes the conveyance screw thereinside rotatably driven in predetermined direction, and reaches the third relay portion 78. The untransferred toner which reached the third relay portion 78 falls by its own weight inside a vertical conveyance tube 77 and reaches the fourth relay portion 85. Untransferred toner which reached the fourth relay portion 85 passes through a tube 80 as a toner conveyance path, which includes a toner conveyance coil 81 thereinside rotatably driven by a driving motor 86, and reaches the waste toner container 90 via a collection opening 91 as shown by broken line arrows in FIG. 3A. Finally the untransferred toner which reaches the waste toner 90 is collected inside the waste toner 90 as the waste toner.

Figure 4A:
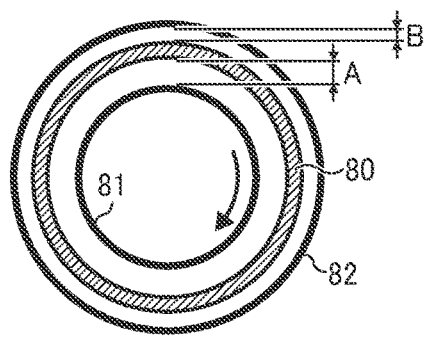
FIG. 4A is a cross-sectional view of a toner conveyance device, as viewed in an orthogonal direction in which toner is transported.
Figure 4B:
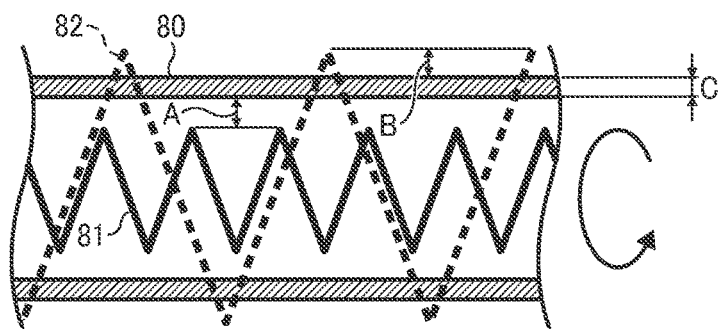
FIG. 4B is a cross-sectional view of a toner conveyance device, as viewed in a direction in which toner is transported.
Figure 4C:
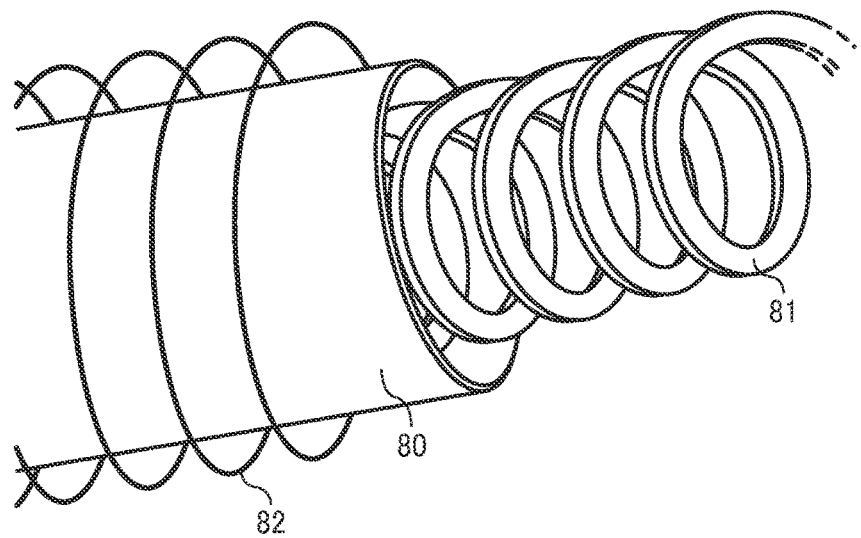
FIG. 4C is an exploded perspective view of a toner conveyance device.

In this embodiment, the tube 80 (i.e., the toner conveyance tube, the toner conveyance pipe, the toner conveyance path) is formed of a flexible material (i.e., an elastic material) in order to compose the toner conveyance channel between the fourth relay portion 85 and the waste toner container 90 and avoiding interference or contact with other components, for example the sheet feeding unit 26 or other motors shown in FIG. 1. In FIGS. 4A-4C, the tube 80 (toner conveyance tube) is formed of a rubber material having a thickness T of 2 mm or more, and is bendable (i.e., flexible). For example, the tube is formed of transparent or translucent silicon rubber to which the toner does not adhere well.

Referring to FIG. 3A, and FIG. 3B, relative positions of a discharge opening 87 of the fourth relay portion 85 and the collecting opening 91 of the waste toner container 90 are in a relation of twisted positions (i.e., skew positions). In the continuous tube 80, a position of an inlet 88 of the tube 80 is skewed from a position of an outlet 89 of the tube 80. In other words, the position of the inlet 88 of the tube 80 and the position of the outlet 89 of the tube 80 are neither parallel nor intersecting, according to an embodiment. The continuous tube 80 as the conveyance channel in this embodiment includes a plurality of curved portions which have a relatively high curvature. It is possible to increase a freedom of degree of a shape of the toner conveyance channel because the toner conveyance channel uses a flexible toner conveyance tube.

Referring to FIGS. 4A-4C, the toner conveyance coil 81 is disposed inside the tube 80, the toner conveyance coil 81 is rotatory driven in a predetermined direction to convey the toner inside the toner coil. In addition, the conveyance coil 81 is formed continuously corresponding to the length of the tube 80 (conveyance tube) in the conveyance direction. In other words, the conveyance coil 81 is formed continuously as one component without being divided at an intersection position in the conveyance direction and is extended inside within the conveyance direction area of the tube 80. As the relatively embodiment, if the conveyance coil is formed by combining a plurality components, crosslinking and a lock or jam in the toner conveyance channel may occur. However, if this arrangement is desired, it may be utilized. On the other hand, in this embodiment, the conveyance coil 81 is formed continuously, thereby the conveyance device 70 can ensure an ability of the toner conveyance to prevent an accumulation of toner, without an air pump, even though a shape of the tube 80 as the toner conveyance channel is composed of a relatively complicated shape having one or more high curved portions.

Referring to FIG. 4C, the conveyance coil 81 is provided with a flat or substantially flat plate made of metallic material or resin material which is extended in a spiral shape (i.e., coil shape) in the conveyance direction. The conveyance coil 81 has a high strength and bendability (i.e., flexibility). A cross section of the conveyance coil 81, which the flat plate is formed into a spiral shape, is a substantially rectangular shape which provides a higher conveyance efficiency than a conveyance coil having a cross section which is circular in shape. On the other hand, the flat plate conveyance coil is harder to be curved than the conveyance coil of the rod material type. When the conveyance coil having more severe bending is rotated inside the conveyance tube, there is a possibility that the inner surface of the tube is to be broken because of the contacting conveyance coil to the conveyance tube.

In this embodiment, the occurrence of breaking is more easily avoided by providing a coil-shaped member 82 as described below. Referring to FIGS. 3A-4C, in the toner conveyance device 70 in this embodiment, a coil-shaped member 82 as a restrictor which restricts deformation of the tube 80 (toner conveyance tube) is provided so as to cover the outside of the tube 80. In more detail, the coil-shaped member 82 (i.e., restrictor) is formed with a wire rod having a diameter of about 0.5-1.5 mm made of metallic material such as steel or stainless steel, arranged to be extended in a spiral shape (i.e., coil shape) in the conveyance direction, the coil-shaped member 82 has high strength and bendability (i.e., flexibility). Since the coil-shaped member 82 is extendable in the conveyance direction (i.e. the spiral direction), the shape of inner diameter of the coil-shaped member 82 hardly changes in the curved portion similar to the linear portion. In addition, the coil-shaped member 82 coils all over the conveyance direction area of the tube 80 so as to cover the outer surface of the tube 80, and restricts the tube 80 from an increased deformation in the curved portion.

Figure 5A:
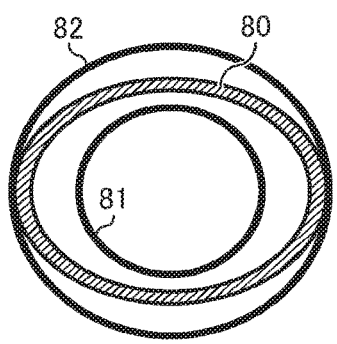
FIG. 5A is a cross-sectional view of a toner conveyance device in a state of a conveyance pipe deformation, as viewed in an orthogonal direction in which toner is transported.
Figure 5B:
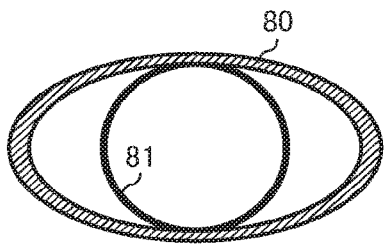
FIG. 5B is a cross-sectional view of a toner conveyance device of a comparative example in a state of a conveyance pipe deformation, as viewed in an orthogonal direction in which toner is transported.

As an alternative embodiment, referring to FIG. 5B, if the coil-shaped member 82 (restrictor) is not provided, the problem such as the conveyance coil 81 interferes with the inner wall of the tube 80 occurs when the tube deform greatly without restricting. As the result, the toner conveyance coil 81 or the tube 80 may be damaged and the ability of the toner conveyance decreased.

On the other hand, referring to FIG. 5A, the deformation of the tube 80 is restricted within a predetermined range by providing the coil-shaped member 82. Even if the tube 80 is kinked or flattened because of a high curvature, the tube 80 interferes with the inner diameter portion of the coil-shaped member 82, thereby restricting deformation of the tube 80 by the coil-shaped member 82. In other words, the long diameter part of the tube 80 when the tube is deformed to elliptic shape is interfered with the inner diameter portion of the coil-shaped member 82, thereby the change of the length of the long diameter part or the short diameter part of the tube 80 when the tube is deformed to elliptic shape is restricted by the coil-shaped member 82. That is to say, the tube 80 will not be deformed beyond the range of inner diameter portion of the coil-shaped member 82. Therefore it is possible to prevent the toner conveyance coil 81 from interfering with an inner wall of the tube 80, even when the tube 80 is deformed.

Accordingly, problems such as the toner conveyance coil 81 or the tube 80 being worn or the driving torque of the toner conveyance coil increasing hardly occurs due to the tube 80 interfering with the toner conveyance coil 81. In addition, it is possible to avoid breaking the tube 80 caused by interfering of an edge of the flat plate of the conveyance coil 81 with the inner surface of the tube 80 by restricting the deformation of the tube 80 by the coil-shaped member 82, even though the conveyance coil of the flat plate material type is provided. Further, it is possible to avoid breaking the tube 80 caused by contacting the conveyance coil 81 with the deformed conveyance tube 80 by restricting the deformation of the conveyance tube 80 by the coil-shaped member 82, even though the conveyance tube 80 has a complicated or severe curving portion such as the position of the inlet 88 of the tube 80 being skewed from the position of the outlet 89 of the tube 80.

In this embodiment, the restrictor to restrict the deformation of the tube 80 within the predetermined range is the coil-shaped member 82 coiled with a gap between the outer surface of the tube 80. Thus, within the curved portion of the tube 80, the coil-shaped member 82 can be curved so as to follow the curved portion of the tube 80. Therefore, even when the coil-shaped member 82 is provided to cover the tube 80, the shape of the toner conveyance channel composed by the flexible tube 80 is not inhibited. In addition, the coil-shaped member 82 does not cover the entire surface of the tube so as not to expose the tube 80, thereby it is possible to visually recognize the outer surface of the tube 80 from the gap of the coil-shaped member 82. Furthermore, when the tube 80 is made of transparent or translucent material, it is possible to visually recognize the inside of the tube 80. Thus a service person can perform maintenance while visually recognizing the condition of the tube 80 without disassembling the toner conveyance device 70, specifically without removing the coil-shaped member 82 from the image forming apparatus 100.

Referring to FIGS. 4A-4C, in this embodiment, when the tube 80 and the toner conveyance coil 81 do not deform, a length (i.e., a clearance) between the inner diameter of the tube 80 and the outer diameter of the toner conveyance coil is A, and a length (i.e., a clearance) between the inner diameter of the coil-shaped member 82 (restrictor) and outer diameter of the tube 80 is B, the lengths A and B satisfy: A>B. In other words, in a normal using condition, when the tube 80 is not bent with the toner conveyance coil 81, the length A and B satisfy: A>B. Thereby when the tube is deformed within the range of the inner portion of the coil-shaped member 82, it is possible to suppress the problem in which the toner conveyance coil 81 interferes with the inner wall of the tube 80. Especially, regarding to the length (the clearance) A and B satisfy: A is 2 mm or more, and B is 1 mm or less, it is possible to suppress the problem where the toner conveyance coil 81 interferes with the inner wall of the tube 80 while maintaining a curving property of the coil-shaped member 82. In this embodiment, the length A is set to about 2-3 mm, and the length B is set to about 0.1-1 mm. Additionally, the tube is hardly buckled or flattened by providing the thickness T of the tube 80 at 2 mm or more, even if a curvature of the tube 80 is relatively high. In this embodiment, the thickness T of the tube 80 is about 2-3 mm.

In this embodiment, a part of the toner conveyance channel in the toner conveyance device 70 including the flexible tube 80 and the coil-shaped member 82 may be applied to only part of the tube 80. Alternatively, the structure of the flexible tube 80 and the coil-shaped member 82 can also be applied to the entire toner conveyance channel of the toner conveyance device 70.

In this first embodiment, this invention is applied to the toner conveyance device 70 which conveys the toner from the cleaning device 2Y and the belt cleaning device 16Y as the toner transport source to the waste toner container 90 as the toner transport destination. Also, it is possible to apply this invention to the image forming apparatus as the second embodiment in which the toner or the developer (toner and carrier) in the developing device 5Y is refreshed by discharging the excess toner or the developer from inside of the developing device 5Y while supplying the toner or developer in the developing device 5Y. In this embodiment, the toner conveyance device conveys the toner or the developer from developing device 5Y as the toner transport source to the waste toner container, in which excess toner or developer discharged from inside the developing device 5Y is collected as the waste toner, as the toner transport destination.

In third embodiment, referring to FIG. 2, a fresh toner conveyance pipe 62 is made of a flexible tube which includes the toner conveyance coil thereinside. In this case, it is possible to apply this invention to the toner conveyance device (the toner conveyance device 60) which conveys the toner from the toner container 30Y as the toner transport source to the developing device 5Y as the toner transport destination. In addition, it is possible to apply the invention to a toner conveyance device which conveys not only toner but also carrier.

Figure 6:
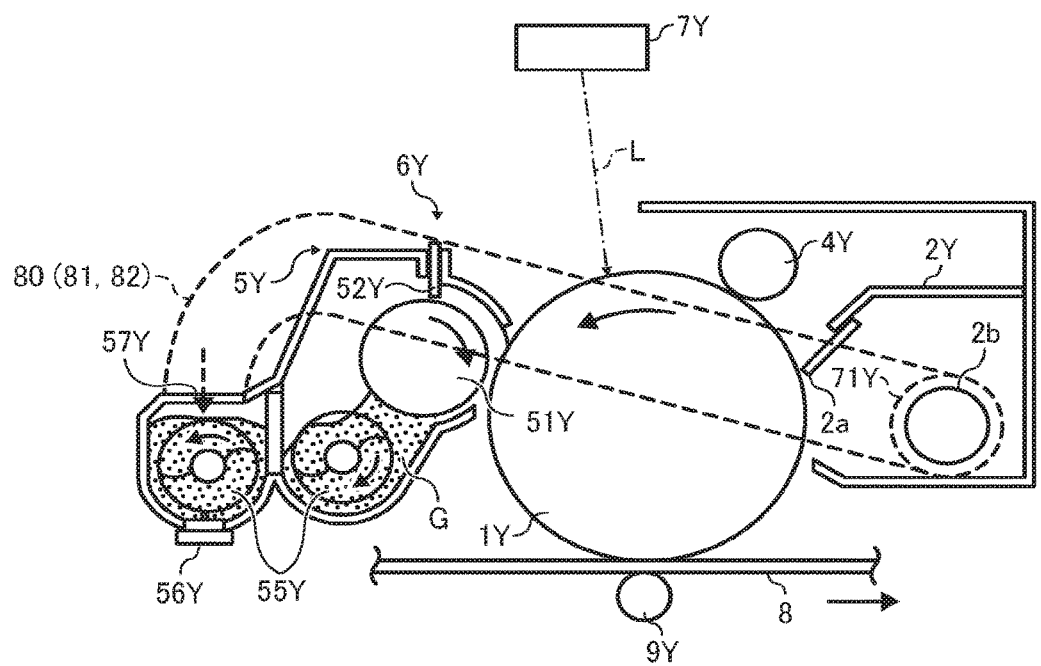
FIG. 6 is a schematic entire view of a toner conveyance device according to another embodiment.

In the fourth embodiment, referring to FIG. 6, the untransferred toner cleaned and collected by the cleaning device 2Y is supplied to the developing device 5Y as recycled toner via the flexible tube 80 which includes therein the toner conveyance coil. It is also possible to apply this invention to the toner conveyance device which conveys the toner from the cleaning device 2Y as the toner transport source to the developing device 5Y as the toner transport destination.

As explained above, the toner conveyance device 70 of these embodiments include the flexible tube 80 as the toner conveyance pipe, the toner conveyance coil 81 inside the tube 80, and the coil-shaped member as a restrictor which restricts the deformation of the outer diameter of the tube 80 provided so as to cover the outer surface of the tube 80. Thus, even when the toner conveyance channel is composed by the flexible tube 80 which includes the toner conveyance coil 81 thereinside, the problem which the toner conveyance coil 81 inside the tube 80 interferes with an inner wall of the tube 80 in the state of being buckled or flattened hardly occurs.

In these embodiments, though this invention applies to the color image forming apparatus 100 which includes the plurality image forming section (i.e., process cartridge), this invention also applies to a monochrome image forming apparatus having one image forming section.

Numerous additional modifications and variations are possible in light of the above teachings. It is therefore to be understood that, within the scope of the appended claims, the disclosure of this patent specification may be practiced otherwise than as specifically described herein. Additionally, effects of the embodiments mentioned above are examples of preferable effects, and effects attained by various aspects of this specification are not limited thereto.

What is claimed is:
1. A toner conveyance device, comprising:
 a toner conveyance path through which toner is transported, the toner conveyance path including a flexible portion;
 a toner conveyor inside the conveyance path to convey the toner, and
 a restrictor outside the toner conveyance path to restrict deformation of the toner conveyance path.
2. The toner conveyance device according to claim 1, wherein:
 a length between an inner diameter of the toner conveyance path and an outer diameter of the toner conveyor is A,
 a length between an inner diameter of the restrictor and an outer diameter of the toner conveyance path is B, and the length A and the length B satisfy: A>B.

3. The toner conveyance device according to claim 2, wherein:
the length A and the length B further satisfy: A≥2 mm and B≤1 mm.

4. The toner conveyance device according to claim 1, wherein:
the toner conveyance path includes silicon rubber.

5. The toner conveyance device according to claim 1, wherein:
the toner conveyance path includes a transparent material.

6. The toner conveyance device according to claim 1, wherein:
a thickness of the toner conveyance path is more than 2 mm.

7. The toner conveyance device according to claim 1, wherein:
the toner conveyor includes a flat plate which extends helically.

8. The toner conveyance device according to claim 1, wherein:
the restrictor includes a wire rod which is coiled at an outer periphery of the toner conveyance path.

9. The toner conveyance device according to claim 1, wherein:
the toner conveyor continuously corresponds to a length of the conveyor in a conveyance direction.

10. The toner conveyance device according to claim 1, wherein:
the restrictor includes a metallic material.

11. The toner conveyance device according to claim 1, wherein:
the restrictor covers an entirety of the toner conveyance path.

12. The toner conveyance device according to claim 1, wherein:
the toner conveyance path includes plural curve portions.

13. The toner conveyance device according to claim 1, wherein:
a position of an inlet of the toner conveyance path is twisted from a position of an outlet of the toner conveyance path.

14. An image forming apparatus, comprising:
an image forming unit to form a toner image on an image bearer;
a cleaning device to clean untransferred toner from the image bearer after the toner image is transferred therefrom;
a waste toner container to contain the waste toner; and
the toner conveyance device according to claim 1 which conveys the toner from the cleaning device to the waste toner container.

15. An image forming apparatus, comprising:
an image forming unit to form a toner image on an image bearer;
a cleaning device to clean untransferred toner from the image bearer after the toner image is transferred therefrom;
a development device to develop the image on the image carrier; and
the toner conveyance device according to claim 1 which conveys the toner from the cleaning device to the development device.

16. An image forming apparatus comprising:
an image forming unit to form a toner image on an image bearer;
a cleaning device to clean untransferred toner from the image bearer after the toner image is transferred therefrom;
a waste toner container to contain the waste toner; and
the toner conveyance device according to claim 1 which conveys the toner from the cleaning device to the waste toner container.

17. A toner conveyance device, comprising:
a toner conveyance path through which toner is transported, the toner conveyance path including a flexible portion;
a toner conveyor inside the conveyance path to convey the toner; and
a coil that spirals outside of the toner conveyance path, wherein:
a length between an inner diameter of the toner conveyance path and an outer diameter of the toner conveyor is A,
a length between an inner diameter of the coil and an outer diameter of the toner conveyance path is B, and
the length A and the length B satisfy: A>B.

18. The toner conveyance device according to claim 17, wherein:
the toner conveyance path includes plural curve portions.

19. The toner conveyance device according to claim 17, wherein:
a position of an inlet of the toner conveyance path is twisted from a position of an outlet of the toner conveyance path.

* * * * *